United States Patent
Gattoni et al.

(10) Patent No.: US 9,930,148 B2
(45) Date of Patent: Mar. 27, 2018

(54) ROADSIDE SIGN CONTROLLER AND DYNAMIC MESSAGE SIGN SYSTEM

(71) Applicant: Adaptive Micro Systems, LLC, Milwaukee, WI (US)

(72) Inventors: Stephen Douglas Gattoni, Thiensville, WI (US); Matthew Kevin Minga, Milwaukee, WI (US); Cyan Edward Boyer, Lake Mills, WI (US)

(73) Assignee: ADAPTIVE MICRO SYSTEMS, LLC, Milwaukee, WI (US)

( * ) Notice: Subject to any disclaimer, the term of this patent is extended or adjusted under 35 U.S.C. 154(b) by 0 days.

(21) Appl. No.: 15/291,611

(22) Filed: Oct. 12, 2016

(65) Prior Publication Data

US 2017/0124866 A1  May 4, 2017

Related U.S. Application Data (60) Provisional application No. 62/250,296, filed on Nov. 3, 2015.

(51) Int. Cl.
| | | |
|---|---|---|
| *G08B 21/00* | (2006.01) | |
| *H04L 29/06* | (2006.01) | |
| *G08G 1/081* | (2006.01) | |
| *G08G 1/095* | (2006.01) | |
| *H04L 12/931* | (2013.01) | |

(52) U.S. Cl.
CPC ........... *H04L 69/163* (2013.01); *G08G 1/081* (2013.01); *G08G 1/095* (2013.01); *H04L 49/35* (2013.01)

(58) Field of Classification Search
None
See application file for complete search history.

(56) References Cited

U.S. PATENT DOCUMENTS

| | | |
|---|---|---|
| 4,603,496 A | 8/1986 | Latz et al. |
| 5,043,716 A | 8/1991 | Latz et al. |
| D360,847 S | 8/1995 | Salimes et al. |
| 5,451,979 A | 9/1995 | Levac |
| 5,872,926 A | 2/1999 | Levac et al. |
| 6,034,970 A | 3/2000 | Levac et al. |
| 6,476,883 B1 | 11/2002 | Salimes et al. |
| 6,675,514 B1 | 1/2004 | Salimes et al. |
| 7,084,935 B2 | 8/2006 | Mandler et al. |
| 7,334,361 B2 | 2/2008 | Schrimpf et al. |
| 7,779,568 B2 | 8/2010 | Gettelfinger et al. |
| 8,104,204 B1 | 1/2012 | Syrstad |

(Continued)

*Primary Examiner* — Brent Swarthout
(74) *Attorney, Agent, or Firm* — Reinhart Boemer Van Deuren s.c.

(57) ABSTRACT

A roadside signal system and a roadside controller are provided relating to the control and operation of roadside signals and signs, such as those used by departments of transportation and municipalities. The roadside signal system and controller are configured to operate using National Transportation Communications for Intelligent Transportation Systems Protocol ("NTCIP") compliant transmissions at both a local and remote level. The roadside controller by itself and as a part of the roadside signal system operates a local network to control multiple signs or signals from a single connection to a central network, thus saving physical space within the roadside cabinets used to store such controllers and virtual network space on the central network.

17 Claims, 7 Drawing Sheets

(56) References Cited

U.S. PATENT DOCUMENTS

| | | | |
|---|---|---|---|
| 8,446,293 B2* | 5/2013 | Stadjuhar, Jr. et al. | 340/907 |
| 2005/0010861 A1 | 1/2005 | Augustyn et al. | |
| 2006/0239001 A1 | 10/2006 | Mandler et al. | |
| 2007/0061065 A2* | 3/2007 | Krikelis | G08G 1/096716 |
| | | | 701/117 |
| 2007/0203840 A1* | 8/2007 | Liu | G06Q 10/0631 |
| | | | 705/51 |
| 2008/0238950 A1 | 10/2008 | Saglam | |
| 2008/0266206 A1 | 10/2008 | Nelson et al. | |
| 2010/0007588 A1 | 1/2010 | Zygmunt et al. | |
| 2011/0199231 A1* | 8/2011 | Loiselle | G09F 9/33 |
| | | | 340/907 |

* cited by examiner

ROADSIDE SIGN CONTROLLER AND DYNAMIC MESSAGE SIGN SYSTEM

CROSS-REFERENCE TO RELATED PATENT APPLICATION

The present application claims the benefit of and priority to U.S. Provisional Application 62/250,296 filed on Nov. 3, 2015, which is incorporated herein by reference in its entirety.

BACKGROUND OF THE INVENTION

The present invention relates generally to the field of roadside signals and roadside signal controllers. In one embodiment the roadside signals are dynamic message signs common to the transportation industry.

SUMMARY OF THE INVENTION

One embodiment of the invention relates to a roadside signal system including a controller having a central network interface configured to interconnect with a central network. The controller is configured to receive and send National Transportation Communications for Intelligent Transportation Systems Protocol ("NTCIP") compliant transmissions. The roadside signal system also includes a plurality of signs connected to controller, and each sign is configured to send and receive NTCIP compliant transmissions. The controller is further configured to route NTCIP compliant transmissions received through the central network interface to one of the plurality of signs, and to send from the central network interface to the central network NTCIP compliant transmissions received from one of the plurality of signs.

Another embodiment of the roadside signal system includes a signal forwarding unit having a central network interface configured to interconnect with a central network. The signal forwarding unit is configured to receive and send NTCIP compliant transmissions. The roadside signal system also includes a cabinet-level instrument connected to the signal forwarding unit and a cabinet-level status indicator connected to the signal forwarding unit. The signal forwarding unit is configured to receive a status indicator signal from the cabinet-level instrument, convert that signal into a NTCIP compliant transmission, and send the converted signal out to the central network from the central network interface. The signal forwarding unit is further configured to receive though the central network interface a NTCIP compliant status transmission, and output that transmission to the cabinet-level status indicator.

Another embodiment of the invention relates to a roadside signal controller for controlling communications to a plurality of electronic road signs including a plurality of sign connectors configured to interconnect with a plurality of electronic road signs and pass-through NTCIP compliant transmissions. The controller also includes a central network connector, which is configured to interconnect with a central network and pass-through NTCIP compliant transmissions. The controller further includes a router that is coupled to the plurality of sign connectors and the central network connector. The router is configured to route NTCIP compliant transmissions received at the central network connector to a sign connector of the plurality of sign connectors and route NTCIP compliant transmissions received at the plurality of sign connectors to the central network connector.

Alternative embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Electronic road signs and signals are controlled by equipment housed in roadside enclosures, typically located close to the roadside signals. The roadside enclosures can vary in size from large to small, but may be part of a preexisting highway infrastructure, where building new enclosures is costly. The control equipment for those signs and signals are connected to central networks where they are monitored and controlled by the relevant municipality, state department of transportation, third party contractors, etc. using the National Transportation Communications for Intelligent Transportation Systems Protocol ("NTCIP"). The NTCIP standard includes guidelines for communication using both legacy serial data connection methods and modern network communication methods such as those used over the World Wide Web.

Traditionally, each road sign and signal requires an individual controller connected to the central network. However, as the amount of roadside technology has increased, Applicant recognized that physical space within the roadside enclosure to accommodate control equipment has become limited and virtual space on the central network has become limited. Accordingly an embodiment of the present disclosure provides a system with a single control unit for multiple signs and signals, all communicating using standard NTCIP communications thus limiting both the physical and virtual space taken up by the system. A single control equipment unit allows use of the existing roadside enclosure infrastructure, thus preventing the system user form having to pay the large costs associated with building additional roadside enclosures, Referring to FIG. 1, an embodiment of a roadside signal system 20 (e.g., a roadside electronic sign system, a dynamic message sign system, etc.) is shown. The roadside signal system 20 includes a roadside sign controller or roadside signal controller, such as roadside controller 22, a plurality of signs 24, and it is configured to communicate with a central network 26. In one embodiment, the roadside controller 22 includes a central network interface 28, a plurality of sign communication connections 30, an I/O Module 34, and a forwarding agent 36. In another embodiment a local Technician 38 can connect to the roadside controller 22 over a local NTCIP network type connection 40 or a local NTCIP serial type connection 42. In other embodiments only the NTCIP network type connection or NTCIP serial type connection is available. The central network 26 may be accessed by a department of transportation or municipality 44 and/or a third party contractor 46 over a remote network connection 48.

Figure 1:
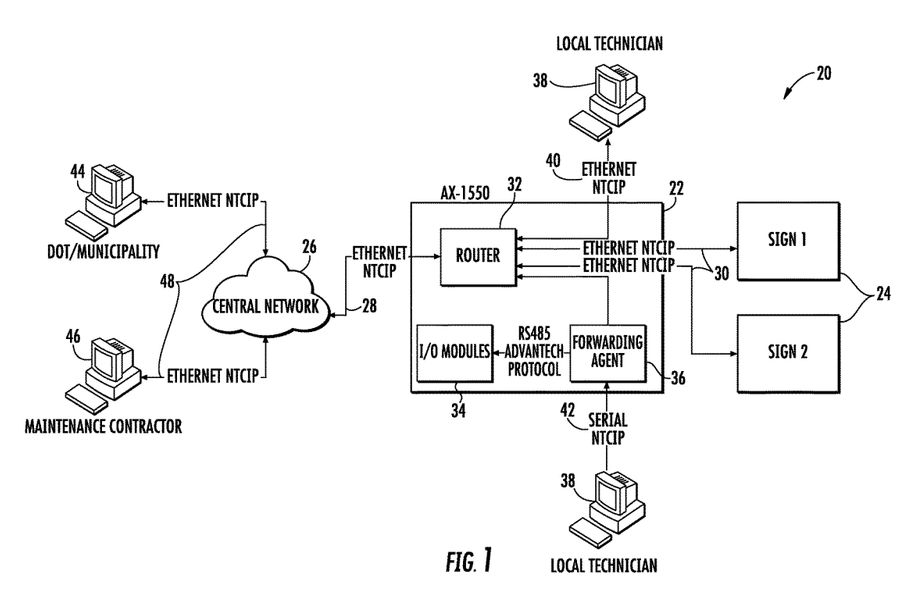
FIG. 1 is a diagram of an embodiment of the roadside signal system.

In operation, the roadside signal system 20 receives various signals from the central network 26 at the central network interface 28. In various embodiments, such signals include NTCIP compliant transmission, such as a request for sign data or a message display command. The NTCIP compliant transmission is routed to a specific sign in the plurality of signs 24. Where the NTCIP compliant transmission is a message display command, the sign will display a particular message as indicated by the transmission. Where the NTCIP compliant transmission is a request for sign data, the sign will send back to the roadside controller 22 an NTCIP compliant transmission containing the requested data. Next, the roadside controller will route the NTCIP compliant transmission received from the sign to the central network interface 28. From there, the signal is sent out to the central network 26 where it can be viewed by the department of transportation or municipality 44 or the third party contractor 46 connected to the central network 26 over the remote network connection 48. It should be understood that routing encompasses various forms of data transfer, including straight pass-through without modification, transformation of some or all bits within the data stream, intentional delay, and/or other similar methods in the field of network data transmission.

Additionally, because the plurality of signs 24 communicate using NTCIP compliant transmissions, they can be connected directly to the central network 26, thus bypassing the roadside controller 22. This feature allows for a more robust and redundant system. If the roadside controller 22 is broken or requires maintenance that will leave it offline for an extended period of time, the plurality of signs 24 can still be operated. Additionally use of NTCIP compliant transmissions throughout the system gives the Department of Transportation, municipality or entity purchasing signs future flexibility in building out the roadside infrastructure because they are not locked in to devices using proprietary communications. This enables such entities to use competitive bidding and market forces to keep down costs while still being able to operate existing equipment.

The roadside controller 22 has a network address compatible with the central network. The network address can be assigned to the roadside controller 22 by the central network or preconfigured inside the roadside controller 22 itself. The roadside controller 22 operates a local network. Each sign in the plurality of signs 24 has a distinct local network address on the local network. The distinct local network addresses may be preconfigured into the plurality of signs 24 or may be assigned to the plurality of signs 24 by the roadside controller 22. In some embodiments, to ensure compatibility with the central network 26, the local network uses an address isolated from that used by the central network 26. In one embodiment, the local and central network addresses are manually assigned.

In one embodiment, the local network is isolated from the central network by using a different IP address range or subnet. In another embodiment, a buffer network may be used between the central network and local network, where the buffer network uses a different IP address range or subnet from both the central network and local network. Under this setup it is possible for the central network and local network to use the same values for the IP address range or subnet, though they will be different instances of that range or subnet capable of communicating through the buffer network. The buffer network may be a single network or a series of chained networks. Though it should be understood that each additional change of IP address range or subnet adds an additional component into the system, because a device is used to associate the addresses on one network with those on the other. In the embodiment where the central network and local network use different IP address ranges or subnets and no buffer network is used, a single device, the roadside controller 22, is used to make the desired associations.

In one embodiment, the central network uses the private IP address range or subnet 192.168.0.0-192.168.255.255 and the local network operated by the roadside controller 22 uses the private IP address range or subnet 10.0.0.0-10.255.255.255. It should be understood that any combination of varying private network address ranges or subnets for the central network 26 and the local network is contemplated. Using different address ranges or subnets allows the roadside signal system 20 not to monopolize IP addresses on the central network 26.

The central network address of the roadside controller 22 and the distinct local network addresses of the plurality of signs 24 have a plurality of network ports through which data is sent and received. A subset of the plurality of ports for each distinct local network address for each sign in the plurality of signs are dedicated to specific communication protocols, including those used in NTCIP network type compliant transmissions. In one embodiment, the specific communication protocols include the Transmission Control Protocol ("TCP") for NTCIP, File Transfer Protocol ("FTP"), and FTP Passive Range as well as the User Datagram Protocol ("UDP") for NTCIP. It should be understood that additional or different protocols may be used to suit the specific needs of the system.

In various embodiments, to properly route data, and specifically NTCIP transmissions, between the central network interface 28 and the plurality of signs 24, the roadside controller 22 associates each port dedicated to a specific communication protocol for each distinct network address for each sign in the plurality of signs 24 with at least one port on the central network address of the roadside controller 22. In one embodiment, the association between the dedicated ports and the ports on the central network address is one to one.

In one embodiment, the distinct local port numbers are assigned default values for each of the dedicated protocols such as 100 for TCP-FTP, 200 for TCP-NTCIP, and 300 for UDP-NTCIP. Because each sign in the plurality of signs 24 has a distinct local network address, the same port number assignments may be used for each sign. In such embodiments, this arrangement allows for easier and less complicated management of the system, because once the specific IP address for a sign is known, the dedicated port for the specific communications protocols will also be known.

In one embodiment, the fourth octet of the distinct local network address for each sign in the plurality of signs 24 is assigned by a formula. The formula being A+Sign Number, where A is some additive integer and the sign number is some unique integer number identifier for each sign in the plurality of signs 24. The fourth octet is the last digits to the right of the last dot of a network address. So in a system where the base address for the local network operated by the roadside controller 22 is 10.11.11.1, the fourth octet is the number 1 and the distinct local network address for each sign will be 10.11.11.Y, where Y is the result of the formula.

Likewise, a formula may be used to determine the port associations from the central network address with the various distinct local network addresses. While the assignment could be done manually in an ad hoc manner for small systems having only a few signs, such an application may not be practical in a system where the plurality of signs 24 is large (e.g. greater than 2 or 3), and may result in conflicting assignments. The use of a formula ensures there is no conflict between signs, and in one embodiment no conflict between common network service ports reserved according to internet standards. In one embodiment, the formula is (Sign Number×M)+distinct local network port number, where the sign number is same unique integer number identifier for each sign in the plurality of signs 24 used to calculate the distinct local network address, though it is contemplated that a different sign number could be used for this formula, and M is some constant integer multiplier. It should be noted that in one embodiment the port numbers for FTP Passive Range are not shifted, so the port numbers, as calculated by the formula, are the same on the distinct local network address for each sign in the plurality of signs 24. In one embodiment, the values 101-150 are used as the default to calculate the port numbers for FTP Passive Range.

In one embodiment, the default distinct port numbers are used, the additive number is 100, the multiplier M is 1000, and the sign numbers for the plurality of signs 24 are the integers 1 through X with 1 being assigned to the first sign, two to the second sign, and so on such that the Xth sign is assigned X integer. The resulting port and network address assignments from this embodiment of the formula are shown in Table 1 below, where the roadside controller 22 has a central network address of 192.168.1.254, and the base address for the local network operated by the roadside controller 22 is 10.11.11.1. It should be understood that multiple combinations of different base network addresses, default port values, additive numbers, multiplies, sign numbers etc. are contemplated and would lead to different results from those shown in Table 1. The results in Table 1 are merely one possible arrangement according to the one possible set of values described above.

among multiple devices such as having one device operating the local network and port associations and another device routing the various transmission to the correct device on the local network. In one embodiment, a separate router and network switch are used inside the roadside controller 22.

In one embodiment, the roadside signal system 20 includes at least one cabinet-level instrument connected to the roadside controller 22. In various embodiments, this instrument includes an analog or digital door switch, local/remote switch, power fail indicator, message trigger, voltage monitor, humidity monitor, or photo sensor monitor. The instrument outputs a status indicator signal that is received by the roadside controller 22. The roadside controller 22 then forwards that status indicator signal to at least one sign in the plurality of signs 24 using a NTCIP compliant transmission. In one embodiment, the cabinet-level instrument outputs the status indicator signal in response to an information request signal from the roadside controller 22.

In another embodiment, the roadside signal system 20 includes at least one cabinet-level status indicator connected to the roadside controller 22. In various embodiments, this status indicator includes a beacon, local remote indicator, or message activation confirmation indicator. The status indicator receives a status transmission forwarded by the roadside controller 22 from a NTCIP compliant status transmission, sent to the roadside controller 22 from one of the plurality of signs 24.

In another embodiment, as shown in FIG. 1, the I/O Module 34 gathers the status indicator signal received by the roadside controller 22 and passes it to the forwarding agent 36 using a RS485 connection. The forwarding agent 36 receives the status indicator signal from the I/O module over the RS485 connection. The forwarding agent 36 translates the received status indicator signal into an NTCIP compliant signal, where it is sent to the router 32. The router 32 routes the NTCIP compliant signal to at least one sign in the plurality of signs 24. Similarly, the router 32 receives from one of the plurality of signs 24 a NTCIP compliant status transmission. The router 22 routes the NTCIP compliant status transmission to the forwarding agent 36. The forwarding agent 36 sends the NTCIP compliant status transmission out over the RS485 connection to the I/O module which outputs it to the status indicator. The status indicator will refresh its state based on the received status transmission

TABLE 1

| Sign Number (Protocol) | Distinct Local Network Address:Port | Central Network Address:Port |
| --- | --- | --- |
| 1 (TCP-FTP) | 10.11.11.101:100 | 192.168.1.254:1100 |
| 1 (TCP-NTCIP) | 10.11.11.101:200 | 192.168.1.254:1200 |
| 1 (UDP-NTCIP) | 10.11.11.101:300 | 192.168.1.254:1300 |
| 1 (TCP-FTP Passive Range) | 10.11.11.101:1101-10.11.11.101:1150 | 192.168.1.254:1101-192.168.254:1150 |
| 2 (TCP-FTP) | 10.11.11.102:100 | 192.168.1.254:2100 |
| 2 (TCP-NTCIP) | 10.11.11.102:200 | 192.168.1.254:2200 |
| 2 (UDP-NTCIP) | 10.11.11.102:300 | 192.168.1.254:2300 |
| 2 (TCP-FTP Passive Range) | 10.11.11.102:2101-10.11.11.102:2150 | 192.168.1.254:2101-192.168.254:2150 |
| X (TCP-FTP) | 10.11.11.(100+X):100 | 192.168.1.254:(1000X+100) |
| X (TCP-NTCIP) | 10.11.11.(100+X):200 | 192.168.1.254:(1000X+200) |
| X (UDP-NTCIP) | 10.11.11.(100+X):300 | 192.168.1.254:(1000X+300) |
| X (TCP-FTP Passive Range) | 10.11.11.(100+X):(1000X+101)-10.11.11.(100+X):(1000X+150) | 192.168.1.254:(1000X+101)-192.168.1.254:(1000X+150) |

In one embodiment of the roadside signal system 20, the router 32 handles the network operation, routing and port association functions of the roadside controller 22. However it is contemplated that those functions could be divided and, if warranted, change states to reflect changes from any previously received status transmission.

In one embodiment, the roadside signal system 20 may be controlled or monitored by a local technician 38. The local technician may connect an external computer or similar terminal to the roadside controller 22 by way of the local NTCIP network type connection 40 or local NTCIP serial type connection 42. When using the local NTCIP network type connection 40, the external computer or terminal has a distinct local network address so that it can communicate with the roadside controller 22 and the plurality of signs 24 through the local network. When using the local NTCIP serial type connection 42 the external computer or terminal interfaces with the forwarding agent 36. The forwarding agent 36 has a distinct local network address on the local network, and is configured to translate data back and forth between legacy NTCIP serial type communication and modern NTCIP network type communication.

Figure 2:
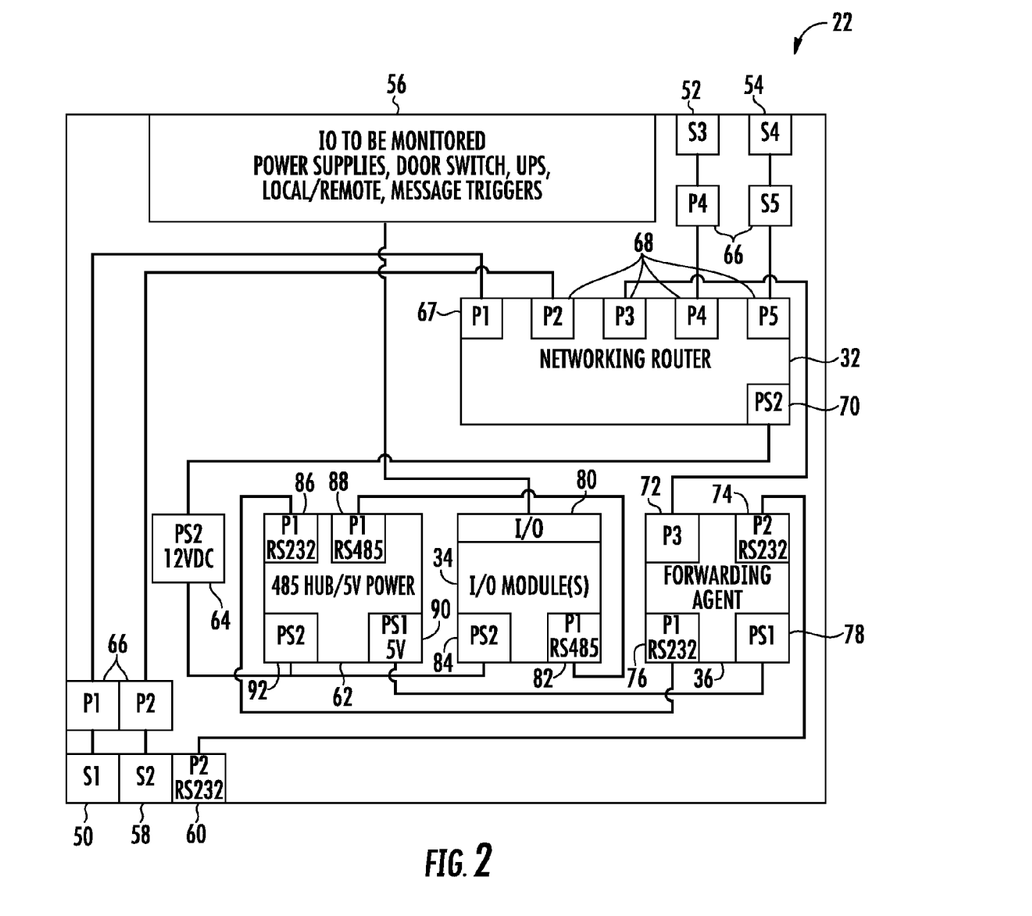
FIG. 2 is an interior schematic view of an embodiment of the roadside signal.

Referring now to FIG. 2, an interior schematic view of an embodiment of the roadside controller 22 is shown. In one embodiment, the road side controller 22 includes a router 32, an I/O module 34, a forwarding agent 36, a central network connector 50, a first sign connector 52, a second sign connector 54, an external I/O interface 56, a local network control connector 58, a local serial control connector 60, a 485 hub 62, a direct current power supply 64, and signal surge protectors 66. The router 32 includes a wide area network ("WAN") port 67, a plurality of local area network ("LAN") ports 68, and a power input 70. The WAN port 67 is coupled to the central network connector 50, and in one embodiment, as pictured in FIG. 2, a signal surge protector 66 is connected between the WAN port 67 and the central network interface 50. The surge protector 66 protects the connected equipment from damage in the event of a power surge or similar circuit short. The power input 70 is connected to the direct current power supply 64. In one embodiment, as pictured in FIG. 2, the direct current power supply 64 is a 12 volt power supply. However, additional embodiments, using different voltages for the direct current power supply 64 based on the requirements of the various component devices of the roadside controller 22, are contemplated. In another embodiment multiple direct current power supplies 64 having different voltages may be used to accommodate the distinct power needs of the various component devices of the roadside controller 22.

The first and second sign connectors 52 and 54 are connected to the router 32 at separate LAN ports of the plurality of LAN ports 68, and in one embodiment signal surge protectors 66 are connected between the LAN ports and sign connectors 52 and 54. The surge protector 66 protects the connected equipment from damage in the event of a power surge or similar circuit short. Other embodiments having only a single sign connector or greater than two sign connectors are contemplated. However, each sign connector has a distinct connection to the router 32. This may be accomplished by increasing the number of LAN ports 68 on the router 32 or employing additional network equipment, such as a managed or unmanaged network switch to expand the number of physical local network connections to the router 32.

The router 32 is configured to route NTCIP compliant transmissions back and forth between the sign connectors 52 and 54 and the central network connector 50. When the roadside controller 22 is operating in an embodiment of the roadside signal system 20, NTCIP compliant transmissions form the plurality of signs 24 are received at the sign connectors 52 and 54. The NTCIP compliant transmissions are passed to the router 32, which routes them to the central network connector 50. The NTCIP compliant transmissions are sent out to the central network 26 from the central network connection 50 over the central network interface 28. The reverse operation is also true. NTCIP compliant transmissions from the central network 26 are received at the central network connector 50 over the central network interface 28. The NTCIP compliant transmissions are passed to the router 32, which routes them to the sign connectors 52 and 54. The NTCIP compliant transmissions are sent out to the plurality of signs 24. Passing transmissions to the router 32 and routing should be understood to encompass various forms of data transfer, including straight pass-through without modification, transformation of some or all bits within the data stream, intentional delay, and/or other similar methods in the field of network data transmission.

In one embodiment, the router 32 is configured with a central network address and to operate a local network. The sign connectors 52 and 54 have an associated local network address on the local network. In one embodiment, the associated local network addresses for the sign connectors 52 and 54 are the expected local network addresses of a potential device connected to connectors 52 and 54, such as a sign from the plurality of signs 24 in the roadside signal system 20. In an alternative embodiment, where there are more than two sign connectors, each sign connector has an associated local network address. This is true whether the number of connectors is expanded by increasing the physical number of connectors on the roadside controller 22 or the expansion is done by connecting a device such as a managed or unmanaged switch to one of the sign connectors on the roadside controller 22. In the latter case, the ports on the managed or unmanaged switch would have associated local network addresses. In one embodiment, the associated local network addresses for the ports on the managed or unmanaged switch are the expected local network addresses of a potential device connected to the ports, such as a sign from the plurality of signs 24 in the roadside signal system 20. In one embodiment, the local network uses a different IP address range or subnet from that of the central network address.

The central network address of the router 32 and the associated local network addresses for the sign connectors 52 and 54 have a plurality of network ports through which data is sent and received. A subset of the plurality of ports for each associated local network address for the sign connectors 52 and 54 are dedicated to specific communication protocols including those used in network type NTCIP compliant transmissions. In one embodiment, the specific communication protocols include the Transmission Control Protocol ("TCP") for NTCIP, File Transfer Protocol ("FTP"), and FTP Passive Range as well as the User Datagram Protocol ("UDP") for NTCIP. It should be understood that additional or different protocols may be used to suit the specific needs of the user.

In various embodiments, to properly route data, and specifically NTCIP transmissions, between the central network connector 50 and the sign connectors 52 and 54, the router 32 associates each port dedicated to a specific communication protocol for each associated network address for the sign connectors 52 and 54 with at least one port on the central network address of the router 32. In one embodiment, the association between the dedicated ports and the ports on the central network address is one to one.

In one embodiment, the associated distinct local port numbers are assigned default values for each of the dedicated protocols such as 100 for TCP-FTP, 200 for TCP-NTCIP, and 300 for UDP-NTCIP. Because the sign connectors 52 and 54 have a different associated local network address the same port number assignments may be used for each connector.

In one embodiment, the fourth octet of the associated local network address for the sign connectors 52 and 54 is assigned by a formula. The formula being A+Sign Connector Number, where A is some additive integer and the sign connector number is some unique integer number identifier for each sign connector. The fourth octet is the last digits to the right of the last dot of a network address. So where the router 32 is configured to operate the local network with a base address of 10.11.11.1, the fourth octet is the number 1 and the associated local network address for each sign connector will be 10.11.11.Y, where Y is the result of the formula.

Likewise, a formula may be used to determine the port associations from the central network address to the various associated local network addresses. In one embodiment, the formula is (Sign Connector Number×M)+associated distinct local network port number, where the sign connector number is same unique integer number identifier for each sign connector used to calculate the associated local network address, though it is contemplated that a different sign connector number could be used for this formula, and M is some constant integer multiplier. It should be noted that in one embodiment the port numbers for FTP Passive Range are not shifted, so the port number as calculated by the formula are the same on the distinct local network address for each sign in the plurality of signs 24. In one embodiment, the values 101-150 are used as the default to calculate the port numbers for FTP Passive Range.

In one embodiment, the default associated distinct port numbers are used, the additive number is 100, the multiplier M is 1000, and the sign connector numbers are 1 for the first sign connector 52 and 2 for the second sign connector 54. The resulting port and network address assignments from this embodiment of the formula are shown in Table 2 below where the router 32 has a central network address of 172.16.1.254, and the base address for the local network operated by the router 32 is 10.11.11.1. It should be understood that multiple combinations of different base network addresses, default port values, additive numbers, multiplies, sign numbers etc. are contemplated and would lead to different results from those shown in Table 2. The results in Table 2 are merely one possible arraignment according to the one possible set of values described above.

TABLE 2

| Sign Connector Number (Protocol) | Associated Local Network Address:Port | Central Network Address:Port |
| --- | --- | --- |
| 1 (TCP-FTP) | 10.11.11.101:100 | 172.16.1.254:1100 |
| 1 (TCP-NTCIP) | 10.11.11.101:200 | 172.16.1.254:1200 |
| 1 (UDP-NTCIP) | 10.11.11.101:300 | 172.16.1.254:1300 |
| 1 (TCP-FTP Passive Range) | 10.11.11.101:1101-10.11.11.101:1150 | 172.16.1.254:1101-172.16.1.254:1150 |
| 2 (TCP-FTP) | 10.11.11.102:100 | 172.16.1.254:2100 |
| 2 (TCP-NTCIP) | 10.11.11.102:200 | 172.16.1.254:2200 |
| 2 (UDP-NTCIP) | 10.11.11.102:300 | 172.16.1.254:2300 |
| 2 (TCP-FTP Passive Range) | 10.11.11.102:2101-10.11.11.102:2150 | 172.16.1.254:2101-172.16.1.254:2150 |

The roadside controller 22 is further configured to monitor at least one analog or digital status indicator signal received at a cabinet-level instrument connection on the external I/O interface 56. In one embodiment, the external I/O interface 56 is coupled to the I/O connection 80 of the I/O module 34. The I/O module 34 includes a RS485 connection 82 and a power input 84 coupled to the direct current power supply 64. The I/O module 34 is configured to package a status indicator signal received at the external interface 56 and passed to the I/O module 34 through the I/O connection 80 into a RS485 data stream, which in one embodiment is sent out the RS485 connection 82 to a RS485 connection 88 on the 485 hub 62.

The 485 hub 62 also includes a RS232 connection 86, a power input 84 coupled to the direct current power supply 64 and a direct current power output 90 coupled to the power input 78 on the forwarding agent 36. In this embodiment the forwarding agent requires a different voltage from the other components of the roadside controller 22, such as 5 volts vs. the 12 volts for the other components, and it is supplied such voltage from the direct current power output 90 of the 485 hub 62. The 485 hub 62 is configured to repackage the status indicator signal received in the RS485 data stream from the I/O module into a RS232 data stream and send the stream out the RS232 connection 86 to a RS232 connection 76 on the forwarding agent 36.

The forwarding agent 36 includes a network connector 72 coupled to one of the plurality of LAN ports 68 and a RS232 control connector coupled to the local serial control connector 60. The forwarding agent 36 is configured to convert the RS232 data stream, containing the status indicator signal, to a NTCIP network type transmission and forward it to the router 32, which is configured to route the NTCIP network type transmission containing the status indicator signal to the sign connectors 52 and 54. It should be understood that in one embodiment the RS232 data stream containing the status indicator signal is an NTCIP compliant serial transmission and in another embodiment the RS232 data stream is simply a generic serial transmission.

In another embodiment, the roadside controller 22 is configured to receive at the sign connectors 52 and 54 a NTCIP compliant status transmission and output that transmission from a cabinet-level status indicator connection on the external I/O interface 56. The process for outputting the transmission is essentially the reverse of the process for monitoring the status indicator signal. The router 32 is configured to route the NTCIP compliant status transmission to the forwarding agent 36 as a NTCIP network type transmission. The forwarding agent 36 is configured to package the status transmission as either a generic or NTCIP compliant RS232 serial data stream and send it to the 485 hub 62. The 485 hub 62 is configured to repackage RS232 serial data stream to a RS485 data stream and send that stream to the I/O module 34. The I/O module 34 is configured to receive the RS485 data stream and output the status transmission form the cabinet-level status indicator connection on the external I/O interface 56.

Figure 3:
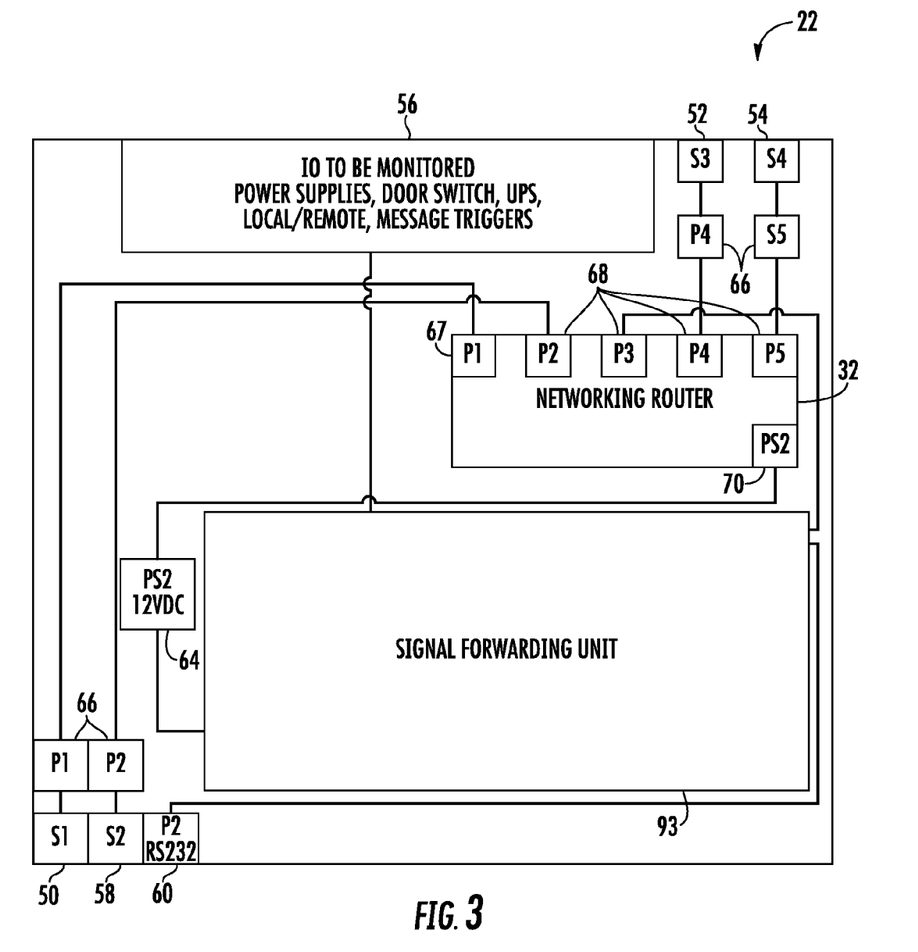
FIG. 3 is an interior schematic view of another embodiment of the roadside signal controller.

Referring to FIG. 3, another embodiment of the roadside controller 22 is shown. In this embodiment the I/O module 34, 485 hub 62, and forwarding agent 36 are replaced by a single signal forwarding unit 93. The signal forwarding unit 93 is configured to perform the combined functions of I/O module 34, 485 hub 62, and forwarding agent 36 as described above, but on a single device. In another embodiment, the single forwarding unit 93 is configured to directly convert the status indicator signal into a NTCIP network type transmission and output the NTCIP network type transmission of the NTCIP compliant status transmission to the cabinet-level status indicator connection on the external I/O interface 56, without packaging the signals in a RS485 or RS232 data stream.

A further embodiment of the roadside controller 22 is shown in FIG. 1, wherein the 485 hub 62 is omitted and the forwarding agent 36 is configured to accept directly a RS485 data stream and convert it to NTCIP network type transmission and to convert the NTCIP network type transmission of the NTCIP compliant status transmission to a RS485 data stream. In another embodiment, similar to that depicted in FIG. 1 and discussed above, an RS232 connection is used between the I/O module 34 and forwarding agent 36. It should also be understood that various manner of data steams capable of transmitting analog and digital signals are contemplated in conjunction with the various embodiments disused above.

In another embodiment, the signal forwarding unit 93 is a separate device from the roadside controller 22. In this embodiment the forwarding unit 93 includes a network interface. In one embodiment, the network interface is a local network interface configured to interconnect with the local network operated by the roadside controller 22. In another embodiment, the network interface is a central network interface configured to interconnect with the central network 26. When the forwarding unit 93 is connected to the central network, the forwarding unit has a network address compatible with the central network. In such an embodiment, the signal forwarding unit 93 performs the various functions of the various embodiments of the signal forwarding unit 93 described above, except that transmissions previously described as being sent to and received from the router 32 are sent to and received from the central network 26 over the central network interface of the signal forwarding unit 93.

Referring now to FIG. 2 and FIG. 3, the roadside controller 22 is configured to accept control data from and send diagnostic data to the local network control connector 58 in the form of NTCIP network type transmissions. The router 32 is configured to route the NTCIP network type transmissions received at the local network control connector 58 to the sign connectors 52 and 54, and route NTCIP network type transmissions received from the sign connectors 52 and 54 to the local network control connector 58.

In another embodiment the roadside controller 22 is configured to accept control data from and send diagnostic data to the local serial control connector 60 in the form of NTCIP serial type transmissions. The forwarding agent 36 or signal forwarding unit 93 are configured to convert incoming control data from the local serial control connector 60 into NTCIP network type transmissions and pass them to the router 32, which is configured to route the NTCIP network transmission to the sign connectors 52 and 54. The forwarding agent 36 or signal forwarding unit 93 are likewise configured to convert NTCIP network type transmissions routed by the router 32 from the sign connectors 52 and 54 into NTCIP serial type transmissions containing diagnostic or similar data and to output that data over the local serial control connector 60.

Figure 4A:
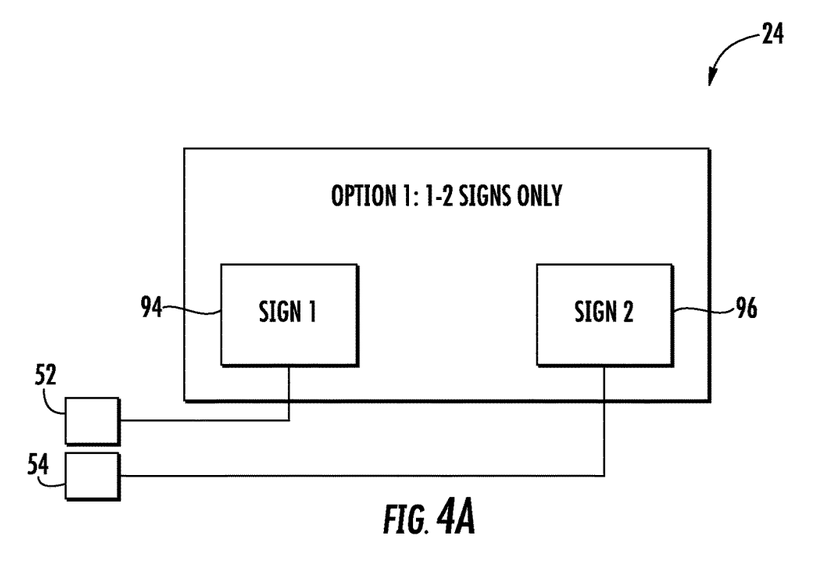
FIG. 4A is a diagram of a sign configuration embodiment for the roadside signal system.
Figure 4B:
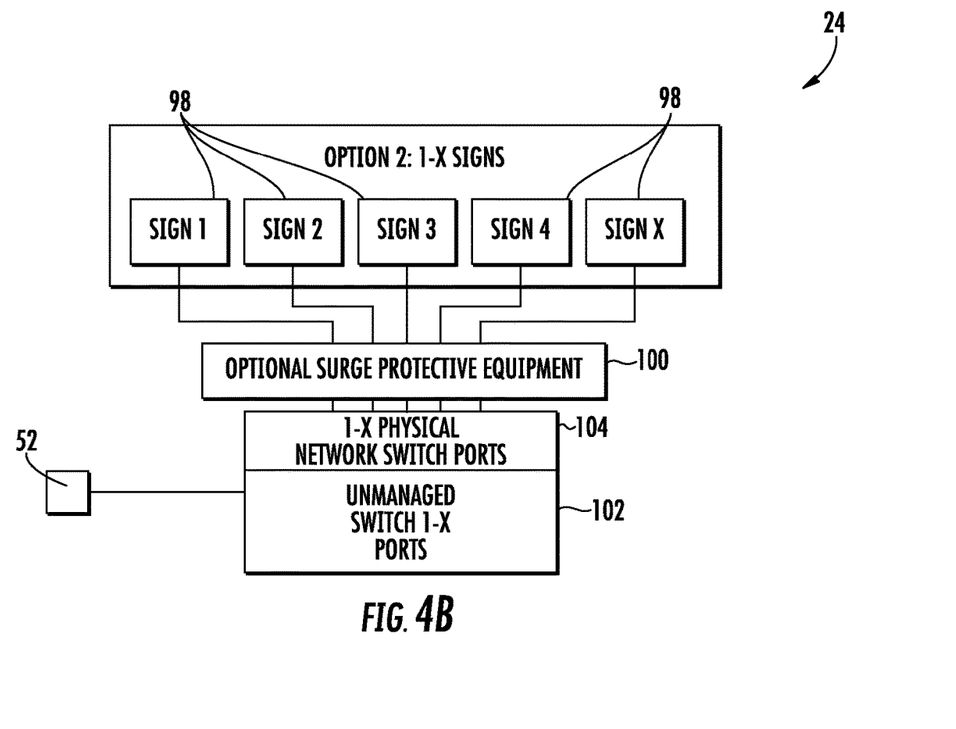
FIG. 4B is a diagram of another sign configuration embodiment for the roadside signal system.

Referring now to FIG. 4A and FIG. 4B, two embodiments of the plurality of signs 24 for the roadside signal system 20 are shown. FIG. 4A shows an embodiment having a first sign 94 and a second sign 96. In this embodiment the first sign 94 is coupled to the first sign connector 52 and the second sign 96 is coupled to the second sign connector 54. FIG. 4B shows an embodiment wherein the plurality of signs 24 comprise 1-X signs 98. 1-X signs 98 are individually connected to 1-X physical network switch ports 104 on an unmanaged switch 102 connected to the first sign connection 52. In one embodiment, optional user provided surge protection equipment 100 is installed between the 1-X signs 98 and the physical network switch ports 104. The surge protection equipment 100 protects the connected equipment from damage in the event of a power surge or similar circuit short. In an alternative embodiment one of the 1-X signs 98 is directly connected to the second sign connector 54.

Figure 5:
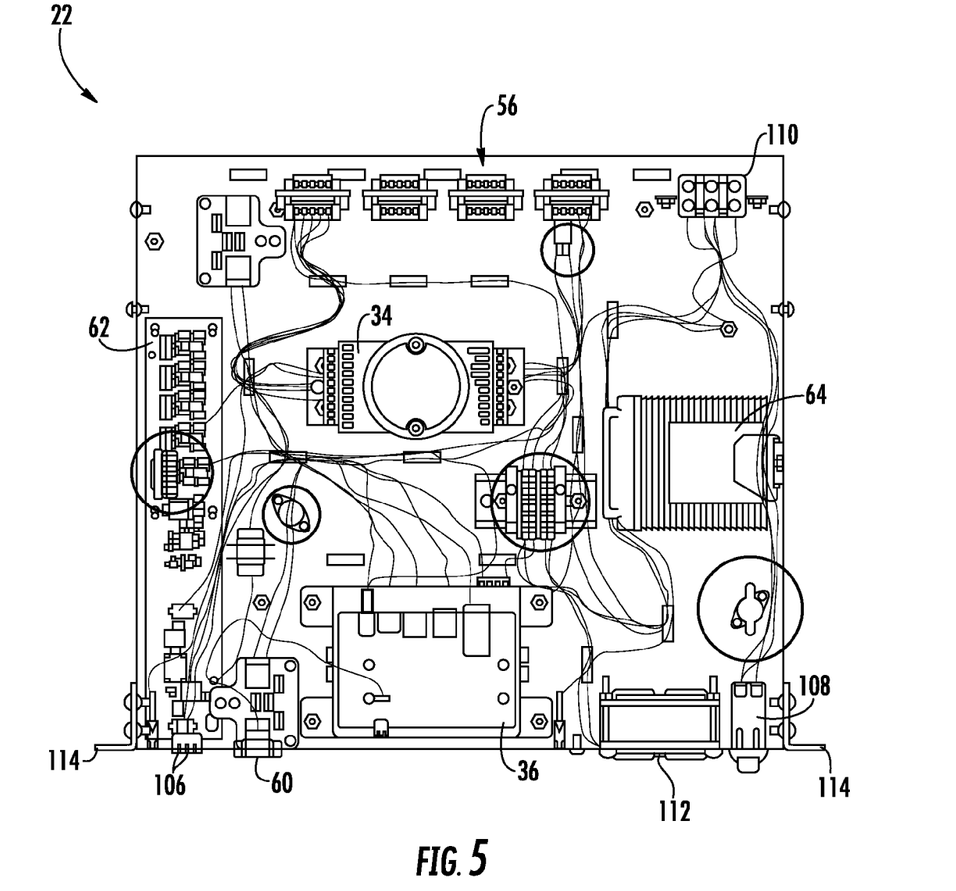
FIG. 5 is a component level interior view of an embodiment of the roadside signal controller.

Referring now to FIG. 5 a component level interior view of an embodiment of the roadside signal controller 22 is shown. Specifically the I/O module 34, the forwarding agent 36, the external I/O interface 56, the local serial control connector 60, the 485 hub 62, and the direct current power supply 64 are shown along with a local remote switch 106, a power switch 108, an alternating current ("AC") input 110, a cooling fan 112, and exterior mounting brackets 114. The local remote switch 106 can be used to toggle the roadside controller 22 between a state where it is controlled remotely and a state where it is controlled locally. The power switch 108 may be used to power on and off the road side controller 22. The alternating current ("AC") input 110 provides power to the roadside controller 22. The cooling fan 112 is used to keep the sensitive electronics within the roadside controller 22 from overheating. The mounting brackets 114 are used to secure the roadside controller 22 inside a roadside enclosure.

Figure 6:
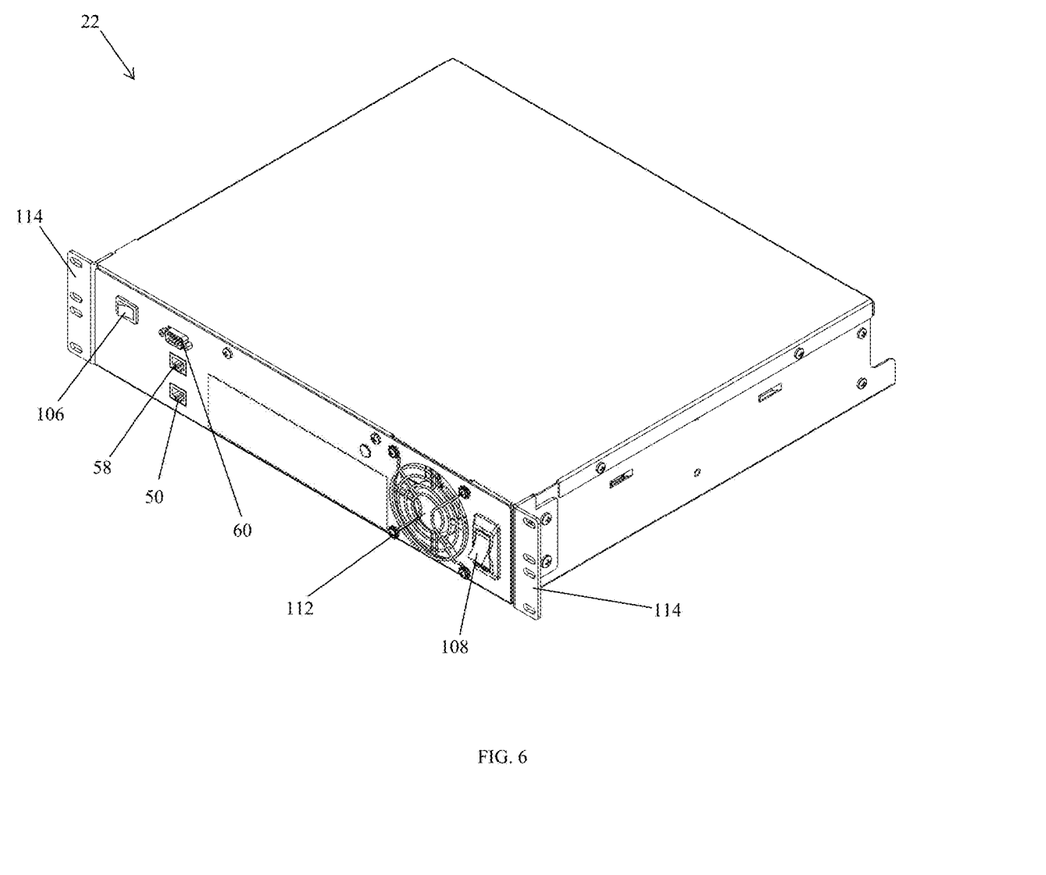
FIG. 6 is a front profile exterior view of an embodiment of the roadside signal controller.

Referring now to FIG. 6 a front profile exterior view of an embodiment of the roadside signal controller 22 is shown. Specifically the central network connector 50, the local network control connector 58, the local serial control connector 60, the local remote switch 106, the power switch 108, the cooling fan 112, and the exterior mounting brackets 114 are shown.

Figure 7:
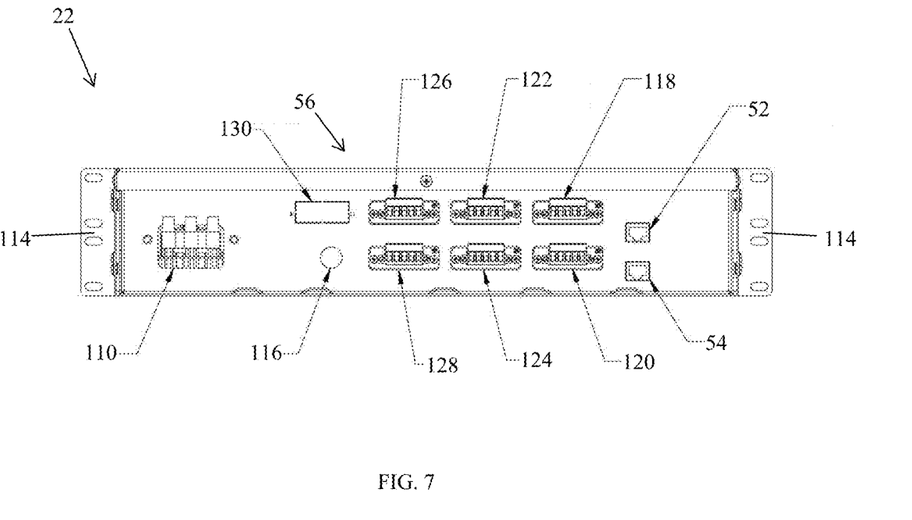
FIG. 7 is a rear exterior view of an embodiment of the roadside signal controller.

Referring now to FIG. 7 a rear exterior view of an embodiment of the roadside signal controller 22 is shown. Specifically, the first sign connector 52, the second sign connector 54, the external I/O interface 56, the AC input 110, and the mounting brackets 114 are shown along with a direct current fuse 116. The direct current fuse is used to protect the sensitive equipment within the roadside controller 22 from a surge or short of power on the direct current power supply 64. The external I/O interface 56 includes terminal blocks 118, 120, 122, 124, 126, 128, and 130. In one embodiment, terminal blocks 118 and 122 are the cabinet-level instrument connection as reserved for digital inputs such as the status indicator signal. In one embodiment, terminal blocks 120 and 124 are reserved for logic ground. In another embodiment terminal blocks 126 and 128 are the cabinet-level status indicator connection reserved for digital outputs such as the status transmission. In another embodiment the terminal block 130 is an expansion port for connecting additional I/O modules to the I/O module 34 so as to expand the amount and type of digital and/or analog inputs and/or outputs that can be sent and received by the roadside controller 22.

It should be understood that the various embodiments of the roadside signal system 20 and roadside controller 22 can be directed to a method of operating said system and controller. It should also be understood that the figures illustrate certain embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A roadside signal system comprising:
a controller having a central network interface configured to interconnect with a central network, the controller configured to receive and send NTCIP compliant transmissions;
a plurality of signs connected to the controller, each sign configured to send and receive NTCIP compliant transmissions;
wherein the controller is configured to route NTCIP compliant transmissions received through the central network interface to one of the plurality of signs and to send from the central network interface to the central network NTCIP compliant transmissions received from one of the plurality of signs; and
wherein the controller has a central network address having a plurality of ports, and each sign of the plurality of signs has a distinct local network address having a plurality of ports each dedicated to a specific communication protocol, and wherein the controller associates each dedicated port on the distinct local network address for each of the plurality of signs with a port of the plurality of ports on the central network address.

2. The roadside signal system of claim 1 wherein the specific communication protocols include at least one of TCP-NTCIP, TCP-FTP, TCP-FTP Passive Range, and UDP-NTCIP.

3. The roadside signal system of claim 2 wherein the dedicated port for the TCP-NTCIP communication protocol on the distinct local network address is the same for every sign in the plurality of signs.

4. The roadside signal system of claim 2 wherein the dedicated port for the TCP-FTP communication protocol on the distinct local network address is the same for every sign in the plurality of signs.

5. The roadside signal system of claim 2 wherein the dedicated port for the UDP-NTCIP communication protocol on the distinct local network address is the same for every sign in the plurality of signs.

6. The roadside signal system of claim 1 further comprising a cabinet-level instrument connected to the controller and wherein the controller is configured to receive a status indicator signal from the cabinet-level instrument and forward that status indicator signal to one of the plurality of signs using NTCIP compliant transmissions.

7. The roadside signal system of claim 1 further comprising a cabinet-level status indicator connected to the controller and wherein the controller is configured to forward NTCIP compliant status transmissions received from one of the plurality of signs to the cabinet-level status indicator.

8. A roadside signal system comprising:
a signal forwarding unit having a central network interface configured to interconnect with a central network, the signal forwarding unit configured to receive and send NTCIP compliant transmissions;
a cabinet-level instrument connected to the signal forwarding unit;
a cabinet-level status indicator connected to the signal forwarding unit;
wherein the signal forwarding unit is configured to receive a status indicator signal from the cabinet-level instrument, convert that signal into a NTCIP compliant transmission, and send the converted signal out to the central network from the central network interface;
wherein the signal forwarding unit is further configured to receive though the central network interface a NTCIP compliant status transmission, and output that transmission to the cabinet-level status indicator; and
wherein the central network has a central network address having a plurality of ports, and each sign of a plurality of signs has a distinct local network address having a plurality of ports each dedicated to a specific communication protocol, and wherein each dedicated port on the distinct local network address for each of the plurality of signs is associated with a port of the plurality of ports on the central network address.

9. A roadside signal controller for controlling communications to a plurality of electronic road signs comprising:
a plurality of sign connectors configured to interconnect with a plurality of electronic road signs and pass-through NTCIP compliant transmissions;
a central network connector configured to interconnect with a central network and pass-through NTCIP compliant transmissions;
a router coupled to the plurality of sign connectors and the central network connector; and
wherein the router is configured to route NTCIP compliant transmissions received at the central network connector to a sign connector of the plurality of sign connectors and route NTCIP compliant transmissions received at the plurality of sign connectors to the central network connector;
wherein each sign connector of the plurality of sign connectors has an associated local network address and the router has a central network address; and
wherein the central network address has a plurality of ports and the associated local network address for each sign connector has a plurality of ports each dedicated to a specific communication protocol, and wherein the router associates each dedicated port on the associated local network address for every sign connector in the plurality of sign connectors with a port of the plurality of ports on the central network address.

10. The roadside controller of claim 9 wherein the specific communication protocols include TCP-NTCIP, TCP-FTP, TCP-FTP Passive Range, and UDP-NTCIP.

11. The roadside controller of claim 10 wherein the dedicated port for the TCP-NTCIP communication protocol on the associated local network address is the same for every sign in the plurality of signs.

12. The roadside controller of claim 10 wherein the dedicated port for the TCP-FTP communication protocol on the associated local network address is the same for every sign in the plurality of signs.

13. The roadside controller of claim 10 wherein the dedicated port for the UDP-NTCIP communication protocol on the associated local network address is the same for every sign in the plurality of signs.

14. The roadside controller of claim 9 further comprising a signal forwarding unit.

15. The roadside controller of claim 14 further comprising a cabinet-level instrument connection coupled to the signal forwarding unit and configured to receive a status indicator signal from a cabinet-level instrument, wherein the signal forwarding unit is configured to convert the status indicator signal to an NTCIP compliant signal and forward the status indicator signal received at the cabinet-level instrument connection to the router, and wherein the router is configured to route the converted status indicator signal to a sign connector of the plurality of sign connectors using a NTCIP compliant transmission.

16. The roadside controller of claim 14 further comprising a cabinet-level status indicator connection coupled to the signal forwarding unit and configured to output a status transmission to a cabinet-level status indicator, wherein the router is configured to route NTCIP compliant status transmissions from a sign connector of the plurality of sign connectors to the forwarding unit, and wherein the forwarding unit is configured to convert the NTCIP compliant status transmission to a generic status transmission and forward the generic status transmission to the cabinet-level status indicator connection.

17. The roadside controller of claim 14 wherein the signal forwarding unit comprises:
- a forwarding agent coupled to the router;
- a 485 hub coupled to the forwarding agent; and
- a I/O module coupled to the 485 hub and configured to receive and send analog and digital signals.

* * * * *